United States Patent
Yamamoto et al.

(10) Patent No.: US 6,622,994 B2
(45) Date of Patent: Sep. 23, 2003

(54) PARTITION MEMBER OF LIQUID FILLED VIBRATION ISOLATING DEVICE

(75) Inventors: Kentaro Yamamoto, Osaka (JP); Yoshio Ihara, Osaka (JP); Tsuyoshi Inada, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/956,133

(22) Filed: Sep. 20, 2001

(65) Prior Publication Data

US 2002/0130455 A1 Sep. 19, 2002

(30) Foreign Application Priority Data

Mar. 14, 2001 (JP) ........................................ 2001-071681

(51) Int. Cl.[7] .................................................. F16F 5/00
(52) U.S. Cl. ................................ 267/140.13; 267/141.4
(58) Field of Search ......................... 267/140.13, 141.4, 267/140.11, 140.12, 140.3, 140.4, 141, 141.2, 141.5, 141.6, 141.7

(56) References Cited

U.S. PATENT DOCUMENTS

| | | | | |
|---|---|---|---|---|
| 2,132,840 A | * | 10/1938 | Workman et al. | 105/422 |
| 4,719,892 A | * | 1/1988 | Lopez-Crevillen | 123/195 C |
| 5,950,994 A | * | 9/1999 | Hosoya et al. | 267/140.13 |
| 5,988,611 A | * | 11/1999 | Takashima et al. | 267/140.13 |
| 6,170,811 B1 | * | 1/2001 | Yotani et al. | 267/140.13 |
| 6,357,731 B1 | * | 3/2002 | Tanahashi | 267/140.13 |
| 6,378,850 B1 | * | 4/2002 | Shimizu | 267/140.13 |
| 6,435,487 B1 | * | 8/2002 | Takaoka et al. | 267/140.11 |

* cited by examiner

Primary Examiner—Christopher P. Schwartz
Assistant Examiner—Xuan Lan Nguyen
(74) Attorney, Agent, or Firm—Wenderoth, Lind & Ponack, L.L.P.

(57) ABSTRACT

A partition member having a rubber elastic membrane of a liquid filled vibration isolating device is provided. A ring-shaped metal fitting is formed by superimposing a first ring-shaped metal fitting on a second ring-shaped metal fitting. The first metal fitting and the second metal fitting are formed by press molding and are bonded integrally by means of the rubber elastic membrane thereby closing the opening of the ring-shaped metal fitting. Accordingly, the ring-shaped metal fitting of a complex configuration providing an orifice groove for forming the orifice is easily manufactured by simple working.

11 Claims, 5 Drawing Sheets

(a)

(b)

PARTITION MEMBER OF LIQUID FILLED VIBRATION ISOLATING DEVICE

BACKGROUND OF THE INVENTION

The present invention relates to a partition member of a liquid filled vibration isolating device used for supporting a vibration generating body such as an automobile engine.

In general, a vibration generating body such as an automobile engine is supported by a vibration isolating device in order to control vibration transmission from a vibration generating body to a vehicle body. One prior art example is shown in FIG. 6. The vibration isolating device shown in FIG. 6 comprises an outer cylindrical metal fitting 101 secured to a vehicle body, a boss metal fitting 102 secured to an engine, a vibration isolating base body 103 formed of a rubber elastic body interposed between the outer cylindrical metal fitting 101 and the boss metal fitting 102 so as to damp vibration of higher frequency, and a liquid chamber 104 wherein liquid is enclosed.

The liquid chamber 104 is divided into a main liquid chamber 108 and an auxiliary liquid chamber 109 by a partition member 107 formed by a ring-shaped metal fitting 105 and a rubber elastic membrane 106 closing an opening of the metal fitting 105. The main liquid chamber 108 and the auxiliary liquid chamber 109 are communicated with each other by an orifice provided at a peripheral portion of the ring-shaped metal fitting 105. A liquid flow between the main liquid chamber 108 and the auxiliary liquid chamber 109 damps vibration of lower frequency.

A partition member is made of an aluminum casting or synthetic resin casting or constituted by bonding two superimposed metal plates with each other by means of spot-welding. However, since the partition member is provided with an orifice groove opened outwards and an orifice opening at the peripheral portion thereof, a mold construction becomes complicated and in addition secondary working such as trimming work after molding is indispensable. On the other hand, a partition member formed by integrally bonding two metal plates is easily formed by press molding and requires no complicated mold as a molded member. However, it has a drawback in that a bonding process, such as spot-welding, is required.

Further in the case of a partition member providing with a rubber elastic membrane for damping high frequency vibration, a vulcanization adhesion process of the rubber elastic membrane is required, which results the increases in the production process and production cost. Therefore, a partition member of high productivity has been desired.

SUMMARY OF THE INVENTION

In view of the above, it is an object of the present invention to provide a partition member formed by integrally bonding two metal plates, which does not require a complicated mold and trimming work, with high productivity.

In order to attain the above object, the present invention provides a partition member of a liquid filled vibration isolating device comprising a ring-shaped metal fitting provided with an orifice groove opened outwards at an outer periphery thereof and a rubber elastic membrane closing an opening of the ring-shaped metal fitting and providing with an orifice constituted by a space surrounded by the orifice groove and an inner peripheral face of a liquid chamber. The ring-shaped metal fitting is formed by superimposing a first metal fitting in a ring shape and a second metal fitting in a ring shape in the axial direction, at least any one of the first metal fitting or the second metal fitting being bent at its outer peripheral portion so as to form the orifice groove by the outer peripheral portions of the first and second ring-shaped metal fittings. The first metal fitting, the second metal fitting and the rubber elastic membrane are bonded integrally by vulcanization adhesion of inner peripheral overlap spaces of the first and second ring-shaped metal fittings with a peripheral portion of the rubber elastic membrane.

In the partition member in accordance with the present invention, the ring-shaped metal fitting is formed by integrally bonding the axially superimposed metal fittings with the peripheral portion of the rubber elastic membrane without performing an additional bonding process such as spot welding.

In order to integrally and strongly bond the two metal fittings, it is preferable that an inner peripheral portion of the first metal fitting is bent toward the second metal fitting to form an inner rib to be embedded in the peripheral portion of the rubber elastic membrane. Namely, the contact area between the first metal fitting and the peripheral portion of the rubber elastic membrane becomes large and the peripheral portion of the rubber elastic membrane is reinforced by the inner rib so as to not be distorted easily, and thereby the two metal fittings are hardly displaced from each other in the axial direction.

Namely, the present invention also provides a partition member of a liquid filled vibration isolating device comprising a ring-shaped metal fitting provided with an orifice groove opened outwards at an outer periphery thereof and a rubber elastic membrane closing an opening of said ring-shaped metal fitting and providing with an orifice constituted by a space surrounded by the orifice groove and an inner peripheral face of a liquid chamber. The ring-shaped metal fitting is formed by superimposing a first metal fitting in a ring shape and a second metal fitting in a ring shape in the axial direction, at least any one of the first metal fitting or the second metal fitting being bent at its outer peripheral portion so as to form the orifice groove by the outer peripheral portions of the first and second ring-shaped metal fittings. An inner peripheral portion of the first metal fitting is bent toward the second metal fitting to form an inner rib. The first metal fitting, the second metal fitting and the rubber elastic membrane are bonded integrally by vulcanization adhesion of inner peripheral overlap spaces of the first and second metal fittings and the inner rib with a peripheral portion of the rubber elastic membrane.

It is also preferable that a clearance gap is formed at an intermediate portion between the peripheral portion of the rubber elastic membrane and an orifice opening of the orifice groove for preventing the orifice opening from being clogged by a rubber elastic material flowing at the time of vulcanization adhesion.

According to the present invention, since the ring-shaped metal fitting is formed by interposing two metal fittings simply processed, for example by press working and integrally bonding with the rubber elastic membrane, the productivity of the partition member is enhanced and the production equipment can be simplified, which contributes to rational and low-cost production.

DETAILED DESCRIPTION OF THE PREFERRED EMBODIMENT

A preferred embodiment of a partition member of a liquid filled vibration isolating device according to the present invention will now be described in great detail with reference to the accompanying drawings.

Figure 1:
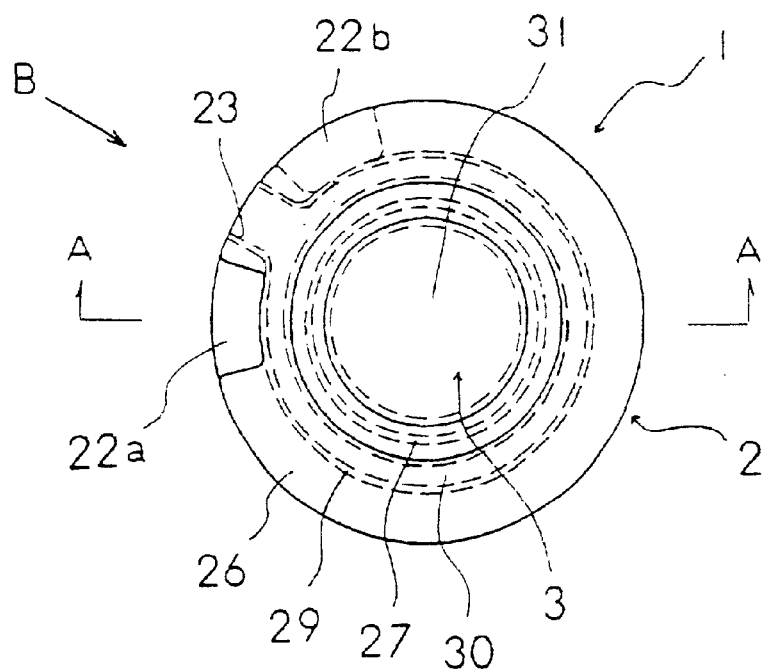
FIG. 1 is a plan view showing one embodiment of a partition member of a liquid filled vibration isolating device according to the present invention.
Figure 2:
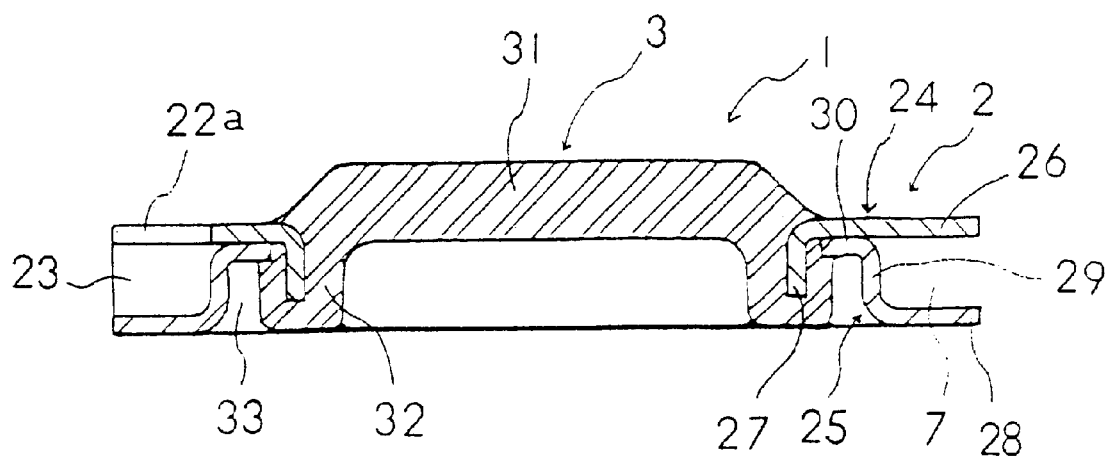
FIG. 2 is a sectional view taken along the line A—A in FIG. 1.

As shown in FIG. 1 and FIG. 2, a partition member 1 of a liquid filled vibration isolating device is comprised of a ring-shaped metal fitting 2 made of steel and having an opening at its center portion and a rubber elastic membrane 3 closing the opening of the ring-shaped metal fitting 2. The partition member 1 is inserted into a liquid chamber 4 of the liquid filled vibration isolating device dividing the liquid chamber 4 into a main liquid chamber 5 and an auxiliary liquid chamber 6. The partition member is fixed by caulking a cylindrical metal fitting 13 as will be later described. At the peripheral portion of the ring-shaped metal fitting 2, an orifice groove 7 opened outwards at an outer periphery thereof is formed. A space surrounded by the orifice groove 7 and an inner peripheral face of the liquid chamber 4 constitutes an orifice B.

Figure 4:
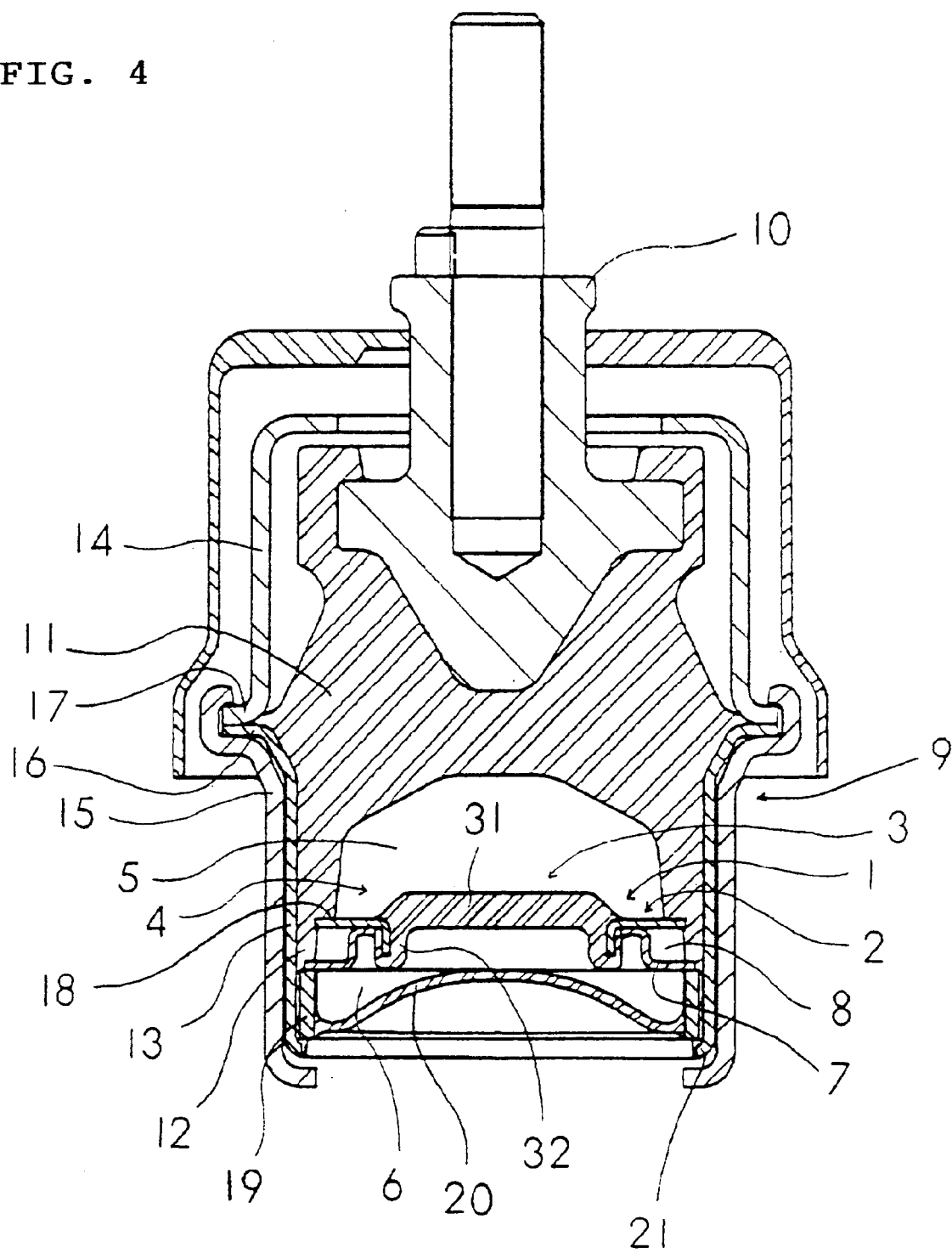
FIG. 4 is a longitudinal sectional view of the liquid filled vibration isolating device assembling the partition member.

As shown in FIG. 4, the liquid chamber 4 of the liquid filled vibration isolating device is provided at the inside of an outer cylindrical metal fitting 9 to be attached to a member of a vehicle body and disposed under a vibration isolating base body 11 which supports a boss metal fitting 10 to which an engine or a vibration generating body is mounted. The main liquid chamber 4 is positioned upwardly of the partition member 1 and the auxiliary liquid chamber 6 is positioned downwardly of partition member 1 and the inner peripheral face of the liquid chamber 4 is covered with a seal portion 12 made of rubber elastic body extending from the vibration isolating base body 11 made of rubber elastic body.

The outer cylindrical metal fitting 9 comprises a cylindrical metal fitting 13 supporting the vibration isolating base body 11 and constituting a peripheral face of the liquid chamber 4, a bracket cup 14 disposed at an upper portion of the cylindrical metal fitting 13 and preventing significant displacement of the boss metal fitting 10 both in a radial direction and in an axial direction, and a body side metal fitting 15 attached to an outer periphery of the cylindrical metal fitting 13 and secured to a member of a vehicle body. Outward flanges 16, 17 are formed at the upper portion of the cylindrical metal fitting 13 and at the lower portion of the bracket cup 14, respectively. By caulking the upper end portion of the body side metal fitting 15 in such a manner to clamp together the outward flanges 16, 17, the cylindrical metal fitting 13 and the bracket cup 14 are fixedly connected. The lower end portion of the body side metal fitting 15 is bent radially inwardly.

The seal portion 12, which covers the inner peripheral face of the main liquid chamber 5 is protruded inwardly more than the seal portion 12, which covers the inner peripheral face of the orifice 8, thereby forming a step portion 18 at the borderline of the two seal portions, and the upper side of the orifice groove 7 of the partition member 1 is brought into contact with the step portion 18. Fixed to the inner peripheral face of the seal portion 12 in the auxiliary liquid chamber 6 is a supporting ring 19 made of steel. The lower side of the orifice groove 7 is supported by the upper end portion of the supporting ring 19, so that the partition member 1 is fixedly disposed between the step portion 18 of the seal portion 12 and the supporting ring 19.

An easily deformable diaphragm 20 is attached to the inside of the support ring 19, by vulcanization adhesion, thereby closing the bottom opening of the supporting ring 19 and making the auxiliary liquid chamber 6 changeable in volume. The supporting ring 19 is fixed by caulking a lower end portion 21 of the cylindrical metal fitting 13.

Figure 3:
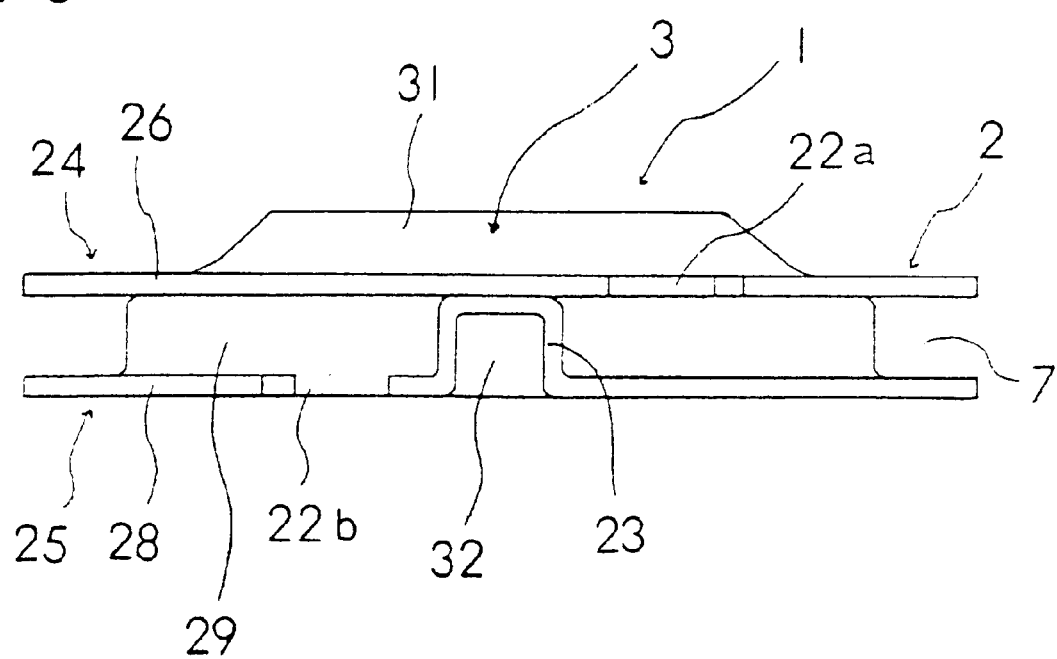
FIG. 3 is an elevational view taken in the direction of the arrow B in FIG. 1.

As shown in FIG. 3, at each of the upper side and the lower side of the orifice groove 7 of the partition member 1, an orifice opening 22a, 22b is formed so as to communicate the main liquid chamber 5 and the auxiliary liquid chamber 6 with the orifice 8. The main liquid chamber 5 and the auxiliary liquid chamber 6 are connected with each other by the orifice opening 22a and the orifice 8. When the vibration isolating body is deformed by vibration, the main liquid chamber 5 changes volume and liquid flows between the main liquid chamber 5 and the auxiliary liquid chamber 6.

The lower side of the orifice groove 7 positioned between the two orifice openings 22a, 22b is bent outwardly in an inverted U shape to form a blocking wall 23 for blocking the flow of liquid, and thereby the flow direction of liquid is limited to one direction to enhance a frictional force for damping the low frequency vibration. In case a liquid flow within the orifice 8 is blocked by the high frequency vibration, a pressure difference between the main liquid chamber 5 and the auxiliary liquid chamber 6 is absorbed by the rubber elastic membrane 3, and thereby the riding comfort is enhanced.

The ring-shaped metal fitting 2 of the partition member 1 is comprised of a combination of the first metal fitting 24 and the second metal fitting 25. The first metal fitting 24 is comprised of a first metal fitting body 26 formed substantially in a disc-shape provided with the orifice opening 22a and an inner rib 27 formed by bending the inner peripheral portion of the first metal fitting body 26 downwardly or toward the second metal fitting 25. The first metal fitting 24 is press molded. The second metal fitting 25 is comprised of a second metal fitting body 28 formed substantially in a disc-shape provided with the orifice opening 22b and the blocking wall 23, a cylindrical portion 29 formed by bending the inner peripheral portion of the second metal fitting body 28 upwardly or toward the first metal fitting 24 and a contact rib 30 formed by bending the upper end of the cylindrical portion 29 radially inwardly. The second metal fitting 25 is also press molded.

The first metal fitting 24 and the second metal fitting 25 are superimposed with each other in the axial direction so that the contact rib 30 of the second metal fitting 25 fitted to the outer periphery of the inner rib 27 of the first metal fitting 24 is brought into contact with the first metal fitting body 26. Said two metal fittings 24 and 25 are integrally bonded with the rubber elastic membrane 3 by bonding the inner peripheral overlap spaces with the peripheral portion of the rubber elastic membrane 3 by vulcanization adhesion. The orifice groove 7 is consisted of the first metal fitting body 26, the second metal fitting body 28 and the cylindrical portion 29.

The rubber elastic membrane 3 is formed of a membrane portion 31 closing the opening of the ring-shaped metal fitting 2 and a ring-shaped leg portion 32 projecting downwardly from the peripheral portion of the membrane portion 31. The ring-shaped leg portion 32 is bonded by vulcanization adhesion to the inner peripheral portion of the inner rib 27 of the first metal fitting 24 and the contact rib 30 of the second metal fitting 25. A ring-shaped clearance gap 33 is formed between the ring-shaped leg portion 32 and the cylindrical portion 29 to prevent the orifice opening 22b from being clogged by rubber elastic material flowing at the time of vulcanization adhesion.

The ring-shaped metal fitting 2 of the partition member 1 provided with the rubber elastic membrane 3 is formed of the combination of two metal fittings, and thereby the ring-shaped metal fitting 2 of a complex configuration providing with the orifice groove 7 for forming the orifice 8 is easily manufactured by applying a simple working of a disc plate such as a press work. Since the two metal fittings are bonded integrally with the rubber elastic membrane 3, no welding process is required.

The inner rib 27 of the first metal fitting 24 increases the contact area of the first metal fitting 24 with the rubber elastic membrane 3 and reinforces the ring-shaped leg portion 32 of the rubber elastic membrane 3 to minimize the deformation of the leg portion 32, and thereby the two metal fittings can be strongly bonded with each other. Since the orifice groove 7 is fixed between the step portion 18 of the seal portion 12 and the supporting ring 19, the two metal fittings are prevented from being separated, so that the sectional area of the orifice 8 does not change.

Figure 5:
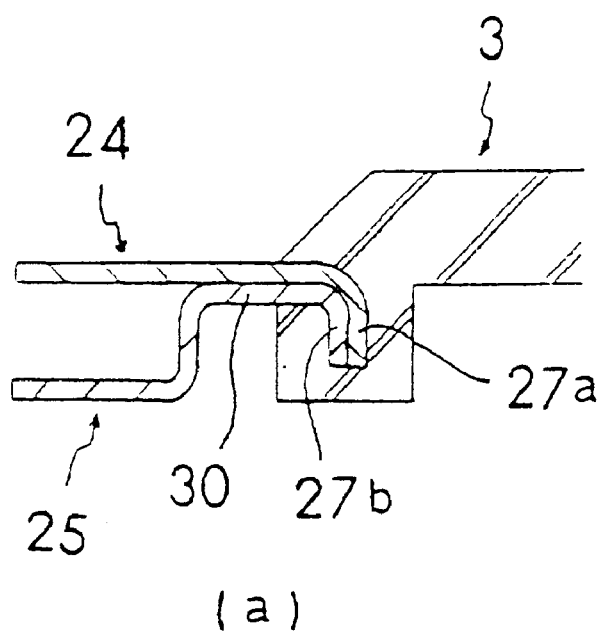
FIG. 5(a) is a partial sectional view showing another embodiment of the overlap spaces of the first and second ring-shaped metal fittings wherein inner ribs are formed at both metal fittings.
FIG. 5(b) is a partial sectional view showing still another embodiment of the overlap spaces simply superimposing both metal fittings without forming an inner rib.
Figure 5:
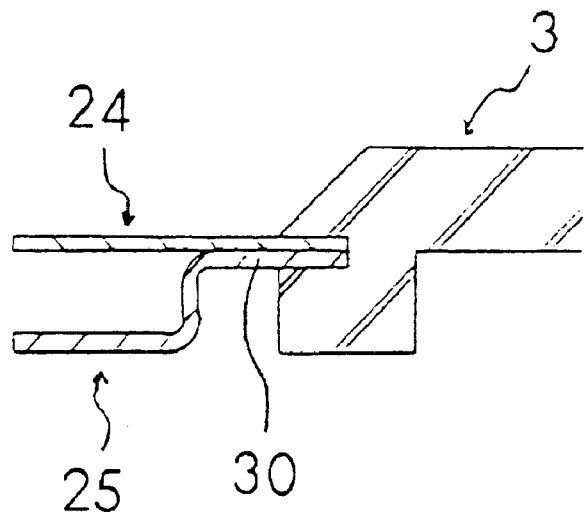
Figure 6:
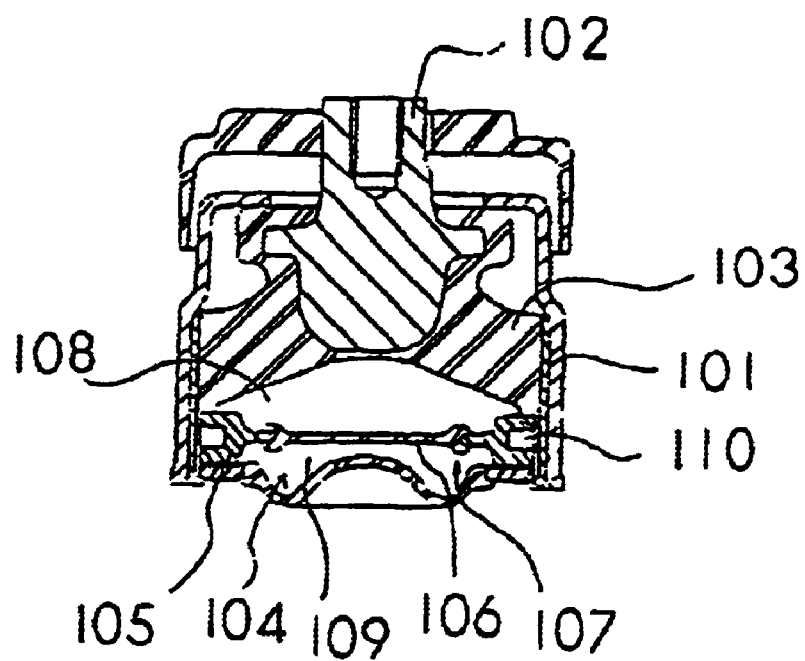
FIG. 6 is a longitudinal sectional view of a conventional liquid filled vibration isolating device.

The overlapped portions or spaces of the first metal fitting 24 and the second metal fitting 25 may be formed as shown in FIG. 5, wherein FIG. 5(a) shows the overlapped portions providing inner ribs 27a, 27b at the two metal fittings and FIG. 5(b) shows the overlapped portions simply superimposing the contact rib 30 of the second metal fitting 25 with the first metal fitting 24 without forming inner ribs.

The orifice groove 7 may be formed by forming the cylindrical portion 29 by bending the second metal fitting 25 or by forming a cylindrical portion by bending the first metal fitting 24 or by forming cylindrical portions at the first metal fitting 24 and the second metal fitting 25. The orifice groove 7 is not necessarily limited to have a substantially U-shaped cross section as in the above preferred embodiment. For example, a triangle-shaped cross section may also be applicable. The blocking wall 23 may be formed by bending downwardly the first metal fitting 24, instead of bending upwardly the second metal fitting 25.

What is claimed is:

1. A partition member for a liquid filled vibration isolating device, said partition member comprising:
   a ring-shaped metal fitting provided with an orifice groove opened outwardly at an outer periphery thereof, said ring-shaped metal fitting comprising a first ring-shaped member and a second ring-shaped member superimposed on said first ring-shaped member in an axial direction,
   wherein one of said first and second ring-shaped members is bent at an outer peripheral portion thereof so as to from the orifice groove; and
   a rubber elastic membrane closing an opening of said ring-shaped metal fitting,
   wherein said rubber elastic membrane is directly bonded to said first ring-shaped member,
   wherein said rubber elastic membrane is directly bonded to said second ring-shaped member, and
   wherein said first and second ring-shaped members are integrally bonded together.

2. A partition member as claimed in claim 1 wherein said first ring-shaped member does not lie under any portion of said second ring-shaped member, and said second ring-shaped member does not lie over any portion of said first ring-shaped member.

3. A partition member as claimed in claim 1 wherein a clearance gap is formed at an intermediate portion between the peripheral portion of said rubber elastic membrane and an orifice opening of the orifice groove in order to prevent the orifice opening from being clogged with rubber elastic material flowing during vulcanization adhesion.

4. A partition member as claimed in claim 1 wherein the orifice groove, an opposing portion of the first and second ring-shaped members that is not bent, and an inner peripheral face of a liquid chamber of the liquid filled vibration isolating device form a liquid flow passage, and wherein said partition member divides the liquid chamber of the liquid filled vibration isolating device into a main liquid chamber and a sub-liquid chamber.

5. A partition member as claimed in claim 1, wherein the inner peripheral portions of said first and second ring-shaped members are bent so as to extend in parallel in the axial direction.

6. A partition member as claimed in claim 1, wherein the inner peripheral portions of said first and second ring-shaped members extend in a radial direction toward the axis of said partition member so as to terminate in axial faces.

7. A partition member for a liquid filled vibration isolating device, said partition member comprising:
   a ring-shaped metal fitting provided with an orifice groove opened outwardly at an outer periphery thereof, said ring-shaped metal fitting comprising a first ring-shaped member and a second ring-shaped member superimposed on said first ring-shaped member in an axial direction,
   wherein one of said first and second ring-shaped members is bent at an outer peripheral portion thereof so as to from the orifice groove, and
   wherein an inner peripheral portion of said first ring-shaped member is bent toward said second ring-shaped member in the axial direction so as to form a rib located radially inwardly of an inner peripheral portion of said second ring-shaped member; and
   a rubber elastic membrane closing an opening of said ring-shaped metal fitting,
   wherein said rubber elastic membrane is directly bonded to said first ring-shaped member,
   wherein said rubber elastic membrane is directly bonded to said second ring-shaped member, and
   wherein said first and second ring-shaped members are integrally bonded together.

8. A partition member as claimed in claim 7, wherein said first ring-shaped member does not lie under any portion of said second ring-shaped member, and said second ring-shaped member does not lie over any portion of said first ring-shaped member.

9. A partition member as claimed in claim 7, wherein a clearance gap is formed at an intermediate portion between the peripheral portion of said rubber elastic membrane and an orifice opening of the orifice groove in order to prevent the orifice opening from being clogged with rubber elastic material flowing during vulcanization adhesion.

10. A partition member as claimed in claim 7, wherein the orifice groove, an opposing portion of the first and second ring-shaped members that is not bent, and an inner peripheral surface of a liquid chamber of the liquid filled vibration isolating device forms a liquid flow passage, and wherein said partition member divides the liquid chamber of the liquid filled vibration isolating device into a main liquid chamber and a sub-liquid chamber.

11. A partition member as claimed in claim 7, wherein the inner peripheral portion of said rib terminates in a radially face, and said second ring-shaped member terminates in an axial face.

* * * * *